US012136360B2

(12) United States Patent
Shinkle, II et al.

(10) Patent No.: US 12,136,360 B2
(45) Date of Patent: Nov. 5, 2024

(54) TAMPER-EVIDENT MEDIA

(71) Applicant: Iconex LLC, Duluth, GA (US)

(72) Inventors: Robert L. Shinkle, II, Peachtree Corners, GA (US); Karolyn Greason, Duluth, GA (US)

(73) Assignee: Iconex LLC, Duluth, GA (US)

( * ) Notice: Subject to any disclaimer, the term of this patent is extended or adjusted under 35 U.S.C. 154(b) by 560 days.

(21) Appl. No.: 16/987,880

(22) Filed: Aug. 7, 2020

(65) Prior Publication Data

US 2020/0365061 A1 Nov. 19, 2020

Related U.S. Application Data

(63) Continuation-in-part of application No. 16/166,032, filed on Oct. 19, 2018, now Pat. No. 11,158,213.

(51) Int. Cl.
*G09F 3/00* (2006.01)
*B65D 33/34* (2006.01)
(Continued)

(52) U.S. Cl.
CPC ........... *G09F 3/0292* (2013.01); *B65D 33/34* (2013.01); *G09F 3/0341* (2013.01); *G09F 3/10* (2013.01);
(Continued)

(58) Field of Classification Search
CPC ........ G09F 3/0292; G09F 3/0341; G09F 3/10; G09F 2003/0211; G09F 2003/0267; G09F 2003/0269; B65D 33/34
See application file for complete search history.

(56) References Cited

U.S. PATENT DOCUMENTS 175,242 A * 3/1876 Fletcher ............... B42D 15/025 283/105
3,935,960 A 2/1976 Cornell
(Continued)

FOREIGN PATENT DOCUMENTS

CA 2134521 A1 5/1995
GB 2179910 A 3/1987
(Continued)

OTHER PUBLICATIONS

Machine translation of the detailed description of KR 2019-0040389. Acquired Apr. 5, 2024.*
(Continued)

*Primary Examiner* — Gerard Higgins
(74) *Attorney, Agent, or Firm* — Schwegman Lundberg & Woessner, P.A.

(57) ABSTRACT

Tamper-evident media is provided. The tamper-evident media comprising a substrate and a plurality of die cuts in first portions of the substrate. A first side of the substrate comprising a print coating or image coating that enables the corresponding side of the substrate to be printed or imaged with custom indicia. A second side of the substrate comprising an adhesive. When the media is imaged with the custom indicia on the first side and adhered onto a surface of an item or an object using the second side. The media is incapable of being removed from the surface without damaging the media along one or more of the die cuts, which provides visible evidence that item was opened, or the object was used.

10 Claims, 9 Drawing Sheets

(51) Int. Cl.
*G09F 3/02* (2006.01)
*G09F 3/03* (2006.01)
*G09F 3/10* (2006.01)

(52) U.S. Cl.
CPC ................. *G09F 2003/0211* (2013.01); *G09F 2003/0267* (2013.01); *G09F 2003/0269* (2013.01)

(56) References Cited

U.S. PATENT DOCUMENTS

| | | | |
|---|---|---|---|
| 5,524,934 | A | 6/1996 | Schwan et al. |
| 5,660,925 | A | 8/1997 | Cooley et al. |
| 5,810,397 | A | 9/1998 | Mehta et al. |
| 5,884,425 | A | 3/1999 | Baldwin |
| 5,970,875 | A | 10/1999 | Hoffmann et al. |
| 6,413,604 | B1 | 7/2002 | Matthews et al. |
| 6,447,015 | B1 | 9/2002 | Linnewiel |
| 7,878,410 | B2 | 2/2011 | Norrby et al. |
| 8,312,655 | B2 * | 11/2012 | Liu ........................ G09F 3/0292 283/105 |
| 11,881,125 | B2 | 1/2024 | Lamb et al. |
| 2005/0230961 | A1 | 10/2005 | Walley |
| 2007/0275133 | A1 | 11/2007 | Sierra-gomez et al. |
| 2009/0015649 | A1 | 1/2009 | Keeton et al. |
| 2009/0145540 | A1 | 6/2009 | Francoeur |
| 2010/0132606 | A1 | 6/2010 | Hagmaier |
| 2010/0233412 | A1 | 9/2010 | Wong et al. |
| 2010/0237605 | A1 | 9/2010 | Vidler et al. |
| 2011/0126439 | A1 | 6/2011 | Liu et al. |
| 2012/0128835 | A1 | 5/2012 | Lyzenga et al. |
| 2012/0249624 | A1 | 10/2012 | Roth et al. |
| 2012/0280483 | A1 | 11/2012 | Jeske et al. |
| 2015/0161915 | A1 | 6/2015 | Wild |
| 2017/0236453 | A1 | 8/2017 | Berbert et al. |
| 2017/0352299 | A1 | 12/2017 | Amron |
| 2019/0228682 | A1 | 7/2019 | Francoeur et al. |
| 2020/0126452 | A1 | 4/2020 | Shinkle, II et al. |
| 2021/0251628 | A1 | 8/2021 | Leung et al. |
| 2022/0246066 | A1 | 8/2022 | Lamb et al. |
| 2024/0087479 | A1 | 3/2024 | Lamb et al. |

FOREIGN PATENT DOCUMENTS

| | | | | |
|---|---|---|---|---|
| JP | 2003291989 | A | | 10/2003 |
| KR | 20120116635 | A | * | 10/2012 |
| KR | 20190040389 | A | | 4/2019 |
| SE | 528869 | C2 | | 3/2007 |
| WO | WO-9119231 | A1 | | 12/1991 |
| WO | WO-0062272 | A1 | | 10/2000 |
| WO | WO-2015017494 | A1 | | 2/2015 |
| WO | WO-2020081845 | A1 | | 4/2020 |
| WO | WO-2022031799 | A1 | | 2/2022 |

OTHER PUBLICATIONS

"U.S. Appl. No. 16/166,032, Restriction Requirement mailed Dec. 3, 2020", 7 pgs.

U.S. Appl. No. 17/374,768, filed Jul. 13, 2021, Tamper-Evident Label.

U.S. Appl. No. 18/513,910, filed Nov. 20, 2023, Labels with Liner Separation Feature.

"U.S. Appl. No. 17/374,768, Notice of Allowance mailed Feb. 7, 2024", 10 pgs.

"U.S. Appl. No. 17/374,768, Corrected Notice of Allowability mailed Feb. 28, 2024", 4 pgs.

* cited by examiner

TAMPER-EVIDENT MEDIA

RELATED APPLICATIONS

This application is a continuation-in-part of co-pending application Ser. No. 16/166,032 filed on Oct. 19, 2018 and entitled: "Tamper-Evident Label;" the disclosure of which is incorporated by reference in its entirety herein.

BACKGROUND

As the market for third-party food delivery services continues to grow, retailers and restaurant owners are searching for solutions that ensure freshness and safety of their products until those products reach their customers.

Containers of prepared or stock food items provide little to no evidence to the retailers, restaurant owners, third-party delivery services, and the consumer that would indicate if the containers have been opened or disturbed at the time that the order is either picked up by a third-party service and/or delivered to the end consumer. Generally, labels are used to indicate security or freshness and may include order and content information as well as caloric information, where required, and freshness controls such as filled by store identifier, dating/coding such as made at time stamp, sell-by or use-by dates as applicable. However, there is no way to ensure that that the label was not removed and re-placed on the container during the preparation and delivery. Accordingly, there is no practical and efficient mechanism by which the retailers and restaurant owners can assure that the containers/bags of food have not been tampered with after packaging and prior to delivery and/or consumption by consumers.

Furthermore, some packages having items that are not food related require security and assurances that they have not been tampered with or opened before arriving to the appropriate individual. Such items may include expensive products, dangerous products, prescriptions, and/or important documents.

Still further and in view of the current COVID19 worldwide pandemic, many employers are concerned about the health and safety of both their employees and their customers. Extensive cleaning and sanitization processes/procedures have been instituted to mitigate the spread of the virus and ensure that employees and customers have some assurances that cleaning and sanitization have been verified. For example, the only assurance that a hotel guest has that his/her room was properly sanitized is a preprinted card left by the staff in the room stated that the room was cleaned and sanitized. This requires faith on the part of the guests based on the mere presence of the card and, perhaps, based on a known reputation of the hotel and/or hotel manager. This same type of faith with respect to proper sanitization is required for renters of rooms, houses, equipment, and/or cars. However, given that the pandemic can be a life or death situation for high-risk COVID19 guests, the cards are grossly inadequate and as a result, many consumers and business travelers remain reluctant to travel during the pandemic.

SUMMARY

In various embodiments, tamper-evident media are provided having tamper-evident features.

Specifically, and in an embodiment, tamper-evident media comprises a substrate and a plurality of die cuts in first portions of the substrate. A first side of the substrate comprising a print coating or image coating that enables the corresponding side of the substrate to be printed or imaged with custom indicia. A second side of the substrate comprising an adhesive. When the media is imaged with the custom indicia on the first side and adhered onto a surface of an object or an item using the second side, the media is incapable of being removed from the surface of the item or the object without damaging the media along one or more of the die cuts or perforations providing visible evidence that the item was opened or tampered with prior to the item being delivered to an intended recipient of that item or providing visible evidence that the object was used prior to use by the intended recipient.

DETAILED DESCRIPTION

Figure 1A:
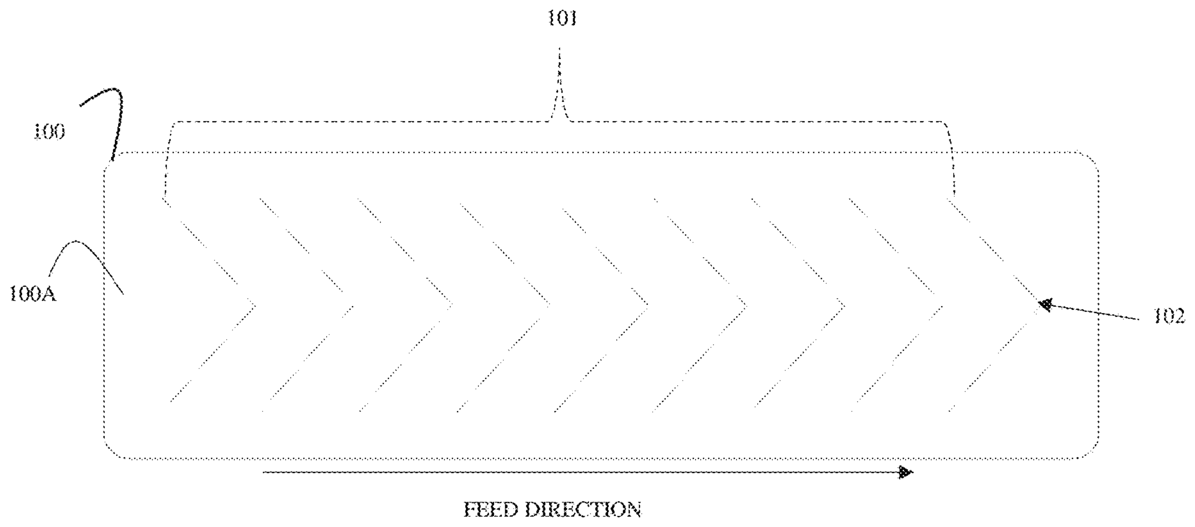
FIG. 1A is a diagram of a tamper-evident label having tamper-evident features, according to an example embodiment.

FIG. 1A is a diagram of a tamper-evident label 100 having tamper-evident features, according to an example embodiment.

As used herein the term "media" may be used synonymously and interchangeably with the phrase "print media." Print media comprises a substrate for which at least one side includes a deposited print coating or image coating. The print coating enables dot matrix or laser-based printing of custom indicia. The image coating enables thermal imaging either through direct thermal heat or through terminal transfer heat selectively applied on the surface of the media having the image coating. The media also may include preprinted branding or designs that is UV flexo printed during the manufacturing process.

The media or print media may comprise labels, rolls of labels, and/or sheets of labels.

The substrate of the media may comprise a paper-based material or a synthetic-based material.

Referring now to the tamper-evident label 100 of FIG. 1A. The label comprises a substrate 100A and a plurality of die cut slits 101 made through the substrate 100A, which weaken the substrate 100A along the perforated die cut slits 101.

A first side of the substrate 100A comprises a print coating or an image coating that enables printing (dot matrix and/or laser) or thermal imaging (direct thermal or thermal transfer).

As used herein and below, "die cut slits" may also include "perforations." That is, anywhere the phrase "die cut slits" appear herein and below that phrase may be replaced with "perforations." such that die cut slits or perforations can be used interchangeably with the teachings presented herein.

The die cut slits 101/perforations 101 are oriented in a direction of a feed path associated with feeding the label 100 through a dot matrix printer, a laser printer, or a thermal printer. The feed path direction may also be associated with manufacture of the label 100 by a press.

The die cut slits 101 comprise sets of two lines 101 that intersect at a single point 102 on first ends 102 of each of the two lines 101. Each set of two lines 101 forming a shape of an arrow heard or a triangle without a base. Each set of two lines 101 that intersect at first ends 102 forming an angle. In an embodiment, the angle is equal to or greater than 90 degrees. Each intersection 102 representing an arrowhead point that is oriented or pointing in the direction of the print and/or manufacture feed path (feed direction) for the label 100. Each set of two lines 101 are separated by a next set of two lines 101 by a preset and equal distance. The die cut slits 101 covering over 80% of a surface area of the front side of the label 100.

The die cut slits 101 are made in first portions of the substrate 100A. Each first portion comprising one of the set of two die cut slits 101 and each first portion is discontinuous from remaining first portions of the die cut slits 10. Furthermore, each first portion of the die cut slits 101 is arranged adjacent to a periphery or one or more edges of the substrate 101A and distributed over a front and back surface substrate 100A. Other second portions of the substrate 100A do not comprise any of the die cut slits 101.

A backside of label 100 comprising an adhesive coating.

The shape, location, orientation, and surface area coverage of the die cuts 101 within label 100 optimally ensure that when the label 100 is subsequently printed on or thermally imaged and adhered to a surface of an item or an object, the label 100 will be torn or damaged along one or more of the sets of die cuts 101 when an attempt is made to remove the label 100 from the surface of the item or the object. This ensures that an intended recipient of the item or an intended user of the object has a readily visibly-apparent indication that the item was opened before being received by the intended recipient or that the object was used before being used by the intended user.

In an embodiment, an item can include a food container, a drink container, a bag, a package, a letter, a bottle, a box, a can, a food wrapper, a plate cover, a cup lid, etc. For example, the label 100 can be adhered to a surface that covers an opening associated with the item, such that the item cannot be opened without breaking the label 100 because any attempt to remove the label 100 from the opening will cause the label 100 to break, tear, or be visibly damaged in some manner along one or more of the die cuts 101.

In an embodiment, on object can include a door, a toilet seat, a cabinet, a drawer, a closet, etc. For example, a rental car driver-side door can have the label 100 adhered on a surface between the door and a driver-side passenger door covering an opening for the driver-side door, such that when the driver side door is opened, the label 100 is broken, but even if the door is not opened, the label 100 breaks when an individual attempts to remove the label from the opening.

The label 100 is a seal that when attempted to be removed from an opening associated with an item or an object surface is damaged, broken, or torn. This is particularly useful to ensure that the item has not been tampered with and to ensure that the object has not been used after the contents associated with the item is prepared for the intended recipient or after the object has been prepared for the intended user. For example, hotels can provide assurance to guests that bathrooms, toilets, etc. have been properly sanitized for the guests by affixing label 100 over toilet lids, drawers, doors, etc. Similarly, food preparers can assure their customers that no one has opened the prepared food by placing the label 100 over openings to the packaging and containers having the prepared food.

Figure 1B:
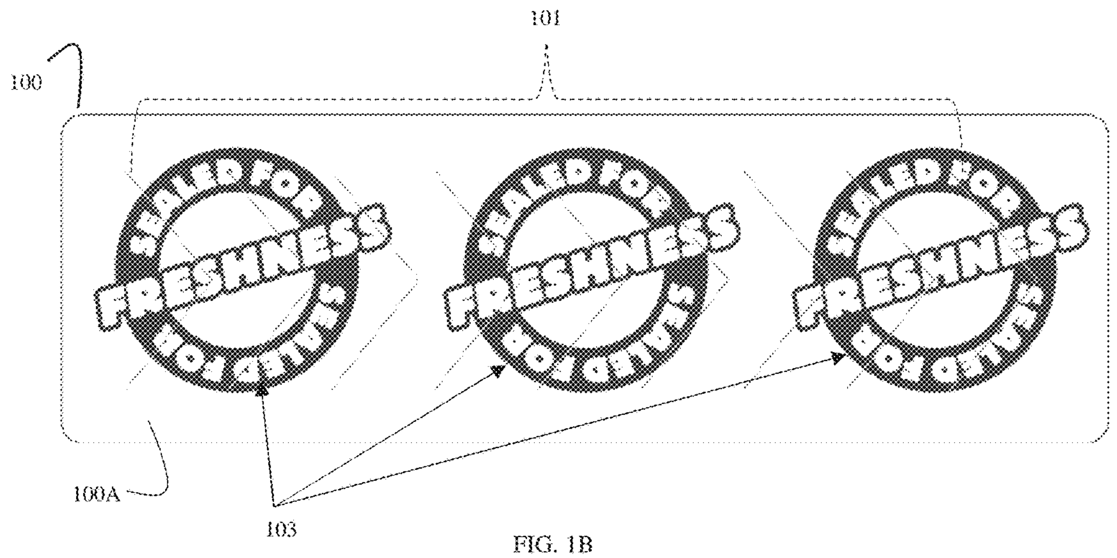
FIG. 1B is a diagram of the tamper-evident label from the FIG. 1A with custom indicia printed or imaged on the tamper-evident label, according to an example embodiment.

FIG. 1B is a diagram of the tamper-evident label 100 from the FIG. 1A with custom indicia 103 printed or imaged on the tamper-evident label 100, according to an example embodiment.

Label 100 includes custom printed or imaged indicia 103 on a first side or front side of label 100. Again, the custom-indicia 103 can be printed using a print coating (by a dot matrix printer or laser printer) on the front side of label 100 or can be imaged using an image coating (by a thermal printer (direct thermal or thermal transfer)) on the front side of label 100.

Figure 1C:
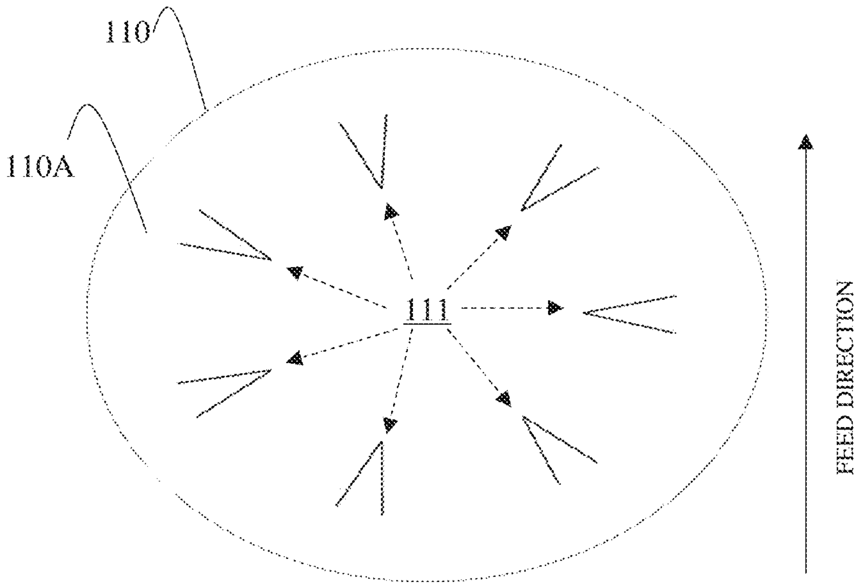
FIG. 1C is a diagram of another tamper-evident label, according to an example embodiment.

FIG. 1C is a diagram of another tamper-evident label 110, according to an example embodiment.

Label 110A comprises a substrate 110A (paper-based material or tape-based material). A front/first side of label 110A comprises a print coating or an image coating. A backside/second side of label 110A comprises an adhesive or an adhesive coating.

Label 110A is circular in shape and comprises a plurality of die cut slits 111 through substrate 110A. the die cut slits 111 comprise sets of two die cut lines 111 that intersect at first ends and that are in the shape of an arrowhead or a triangle without a triangle base. The arrowheads for each set of two die cut slits 111 are pointed towards a center of the circular shaped label 110. Moreover, the sets of two die cut lines 111 are oriented or arranged along a periphery of the label 110. The sets of two die cut lines 111 are oriented and arranged such that any outer edge of label 110 can be grabbed and lifted up so as to cause the label 110 to tear, break, or be damaged in some manner after the label 110 is adhered to a surface of an opening associated with an item or an object.

Figure 1D:
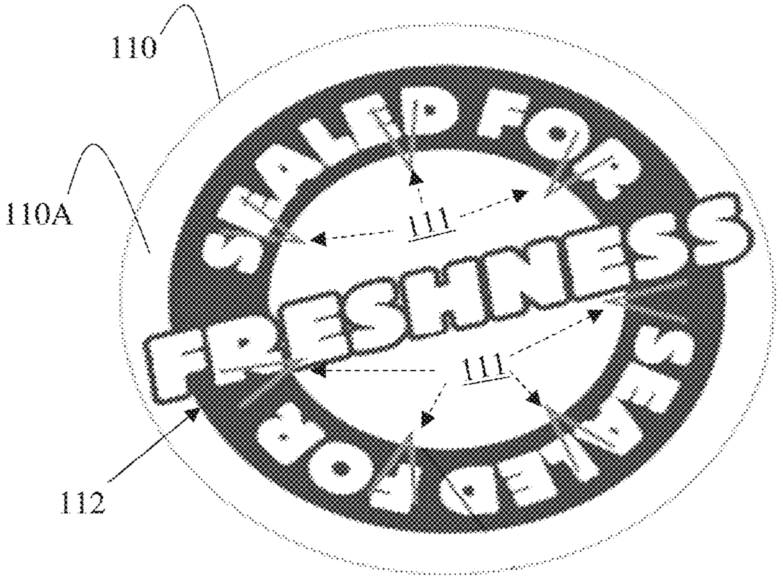
FIG. 1D is a diagram of the tamper-evident label from the FIG. 1C with custom indicia printed or imaged on the tamper-evident label, according to an example embodiment.

FIG. 1D is a diagram of the tamper-evident label 110 from the FIG. 10 with custom indicia 112 printed or imaged on the tamper-evident label 110, according to an example embodiment.

FIG. 1D illustrates custom indicia 112 printed on a front surface of substrate 110A by a printer or imaged on the front surface by a thermal printer using the print coating or the image coating.

Figure 1E:
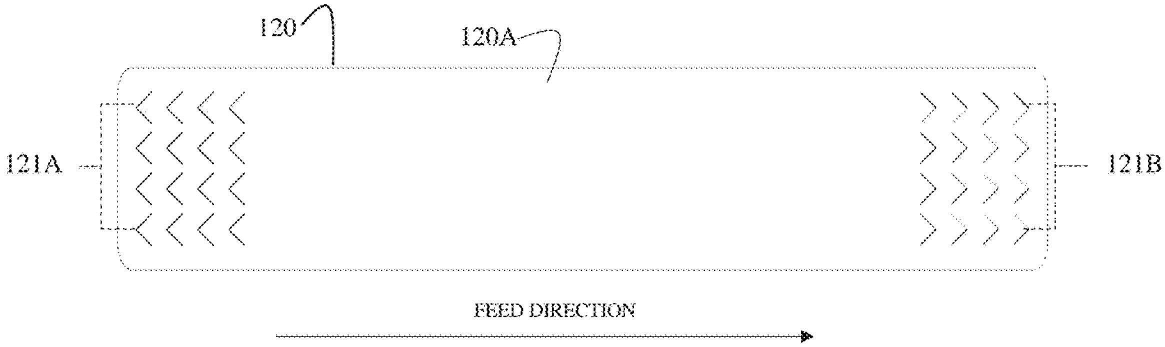
FIG. 1E is a diagram of still another tamper-evident label, according to an example embodiment.

FIG. 1E is a diagram of still another tamper-evident label 120, according to an example embodiment.

Label 120 comprises a substrate 120A (paper-based material or tape-based material). A front/first side of substrate 120A comprises a print coating or an image coating. A backside/second side of substrate 120A comprises an adhesive or an adhesive coating.

Furthermore, label 120 comprises die cut slits 121A and 121B. The die cut slits 121A and 121B are arranges in pairs or sets of two lines 121A and 121B. Each set of two lines 121A or 121B intersect at first ends forming an arrowhead or a triangle without a triangle base. Half of the sets of the two lines 121A are arranged or located on a first end of label 120 and another or remaining half of the two lines 121B are arranged or located on a second end of label 120. The label 120 when adhered to a surface of an item or an object is removed through the first end or the second end; that is a middle of label 120 covers an opening to an item or access to an object, such that the label 120 cannot be removed without also removing the first end or the second end of label 120.

But, die cut slits 121A and 121B are located or situated proximate to and adjacent to both the first end and the second end and any attempt to remove the first end or the second end will result in the first end or the second end of label 120 to be torn, broken, or damaged in some manner along one or more of the die cut slits 121A and 121B. Thus, the arrangement and orientation of the die cut slits 121A and 121B prevent an adhered label to a surface of an item opening or a surface for access to an object from being removed without also damaging the label 120. This provides visual apparent evidence of tampering with the contents of the item or with access to the object based on damage done to label 120 when label 120 is attempted to be removed from the corresponding surface of the item or the object.

In an embodiment, the first half of the die cut slits 121A comprise four rows and four columns of two die cut slits 121A and the second half of die cut slits 121B comprise four rows and four columns of two die cut slits 121B.

Figure 1F:
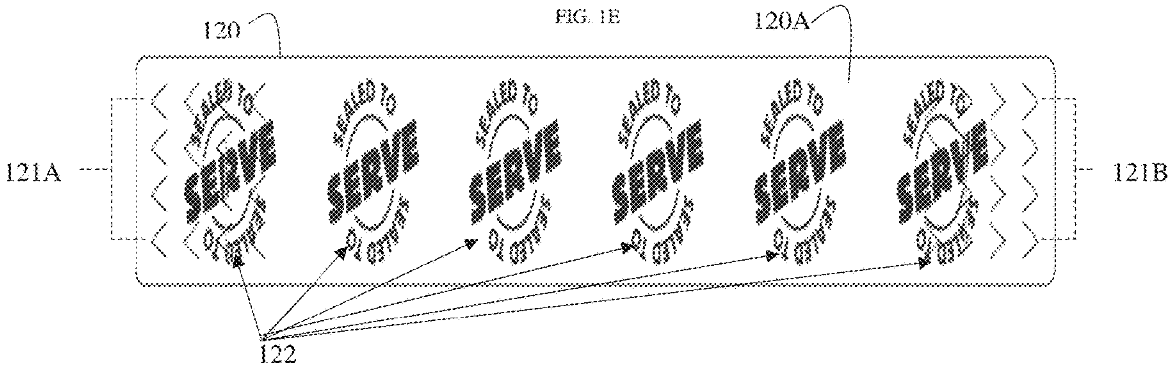
FIG. 1F is a diagram of the tamper-evident label from the FIG. 1E with custom indicia printed or imaged on the tamper-evident label, according to an example embodiment.

FIG. 1F is a diagram of the tamper-evident label 120 from the FIG. 1E with custom indicia 122 printed or imaged on the tamper-evident label 120, according to an example embodiment.

FIG. 1F illustrates a printed (dot matrix or laser printed) or imaged (thermal—direct or thermal transfer) indicia 122 on a front/first side of substrate 120A after processing label 120 through a printer (dot matrix, laser, or thermal) using a print coating or an image coating that was deposited or coated on the front/first side of substrate 120A.

It is to be noted in FIGS. 1B, 1D, 1F, 1G, 1H, 1I, and 1J that custom indicia can be printed or imaged over the corresponding die cut slits on the front/first side of the corresponding substrate for the corresponding labels.

Figure 1G:
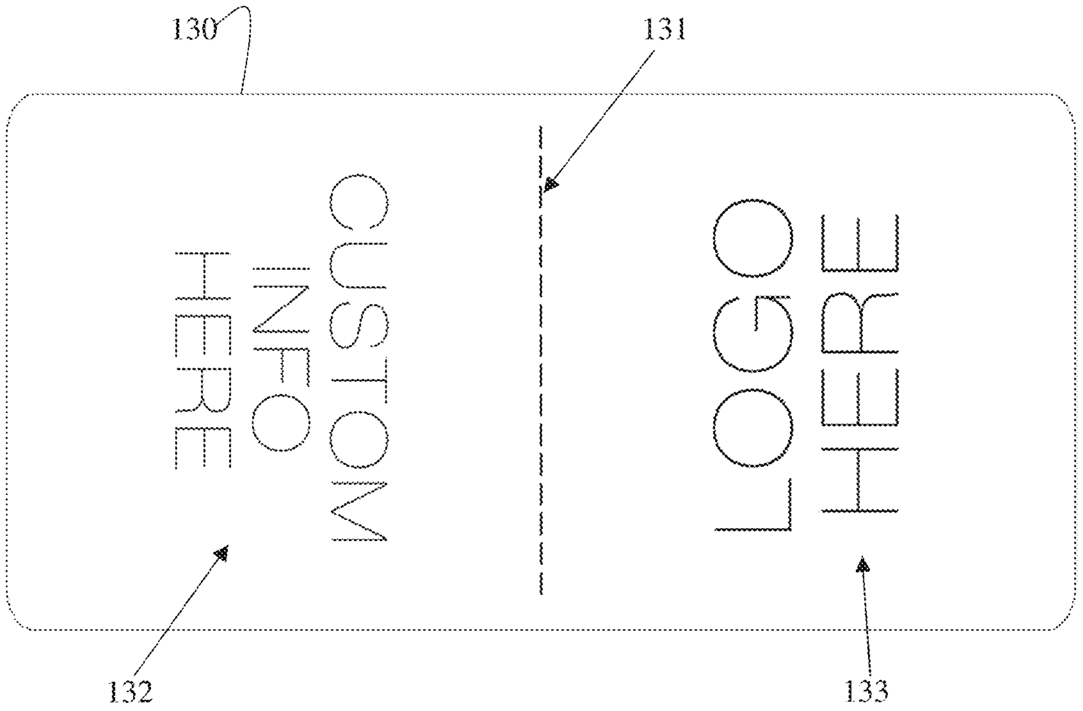
FIG. 1G is a diagram of yet another tamper-evident label having two separate areas enabled with a coating for printing or imaging custom indicia, according to an example embodiment.

FIG. 1G is a diagram of yet another tamper-evident label 130 having two separate areas 132 and 133 enabled with a coating for printing or imaging custom indicia, according to an example embodiment.

Label 130 comprises die cut slits 131 situated in a middle of label 130, each half 132 and 133 can include custom indicia that is printed or imaged on a front side of the corresponding substrate 130A for the label 130.

For example, area 132 may include custom indicia for an order or a given customer whereas area 133 can include custom indicia representing a logo for a company or retailer providing an item or access to an object to the customer.

Die cuts 131 permit label 130 to be adhered over an opening associated with a bag, a letter, a container, a lid, etc.

Figure 1H:
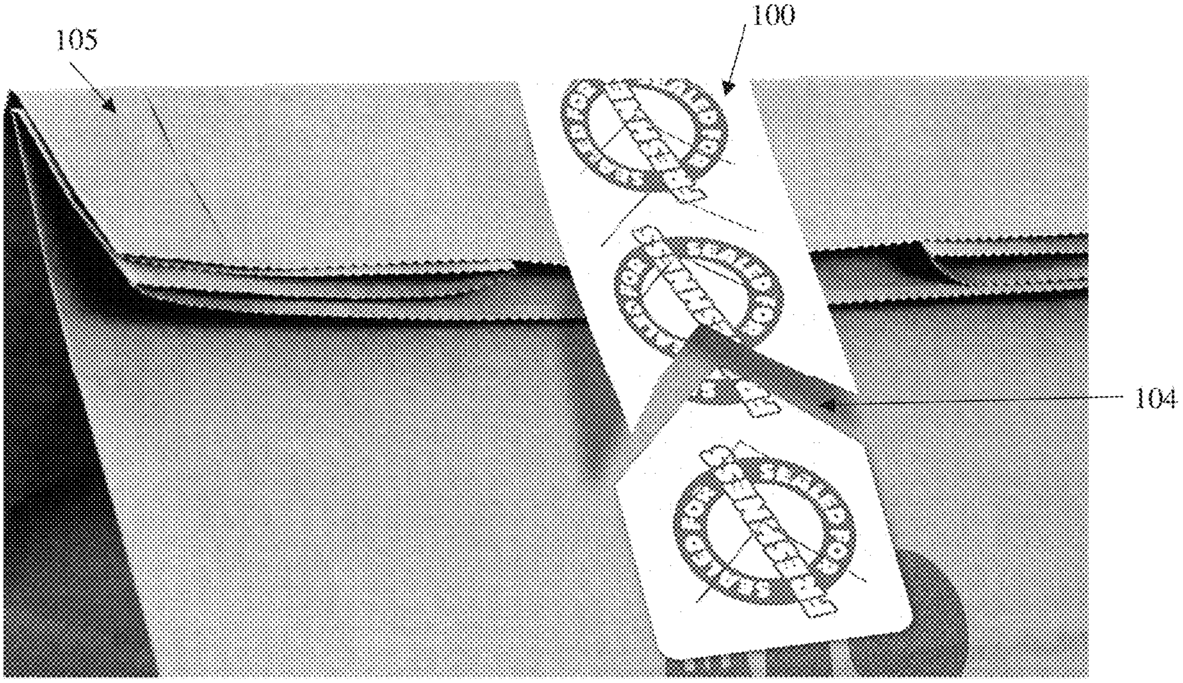
FIG. 1H is a diagram of the tamper-evident label from the FIG. 1B broken after an attempt was made to remove the label from an opening of a bag, according to an example embodiment.

FIG. 1H is a diagram of the tamper-evident label 100 from the FIG. 1B broken 104 after an attempt was made to remove the label from an opening of a bag 105, according to an example embodiment.

Label 100 allows an opening to bag 105 to be sealed shut initially and any attempt by an individual handling the bag 105 to open the bag 105 results in label 100 being broken 104 along one set of die cuts 101.

Figure 1I:
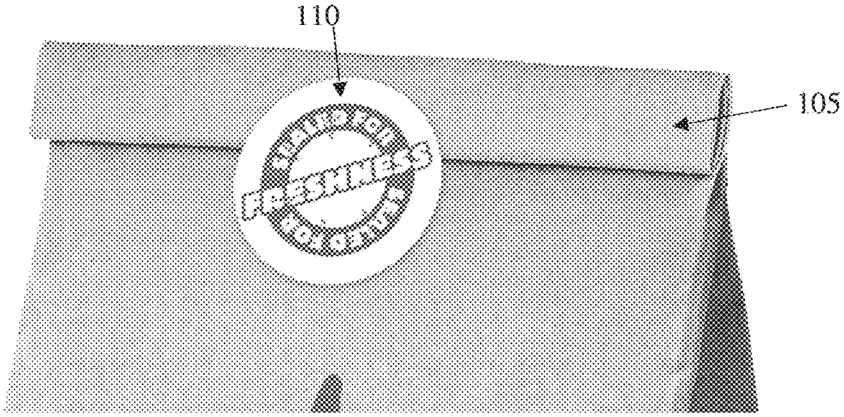
FIG. 1I is a diagram of the tamper-evident label from the FIG. 1D sealed over an opening of a bag, according to an example embodiment.

FIG. 1I is a diagram of the tamper-evident label 110 from the FIG. 1D sealed over an opening of a bag 105, according to an example embodiment.

Circular label 110 can be uses as a seal over an opening of bag 105 similar to what was shown in FIG. 1H. Again, any attempt to access the contents of bag 105 will result in label 110 being torn, broken, or damaged in some manner along one or more of the sets of two die cuts 111.

Figure 1J:
FIG. 1J is a diagram of a sheet of media having a plurality of tamper-evident labels, according to an example embodiment.

FIG. 1J is a diagram of a sheet 140 of print media having a plurality of tamper-evident labels, according to an example embodiment. Although circular labels are shown similar to what was shown with label 110, it is to be noted that any of the above-referenced labels 100, 110, 120, and/or 130 may be imaged on media sheet 140. Media sheet 140 is a print media having dimensions illustrated in FIG. 1J. It is to be noted that other dimensions may be used as well for both the media sheet 140 and the individual manufactured and custom printed or custom imaged labels 100, 110, 120, and/or 130.

Figure 1K:
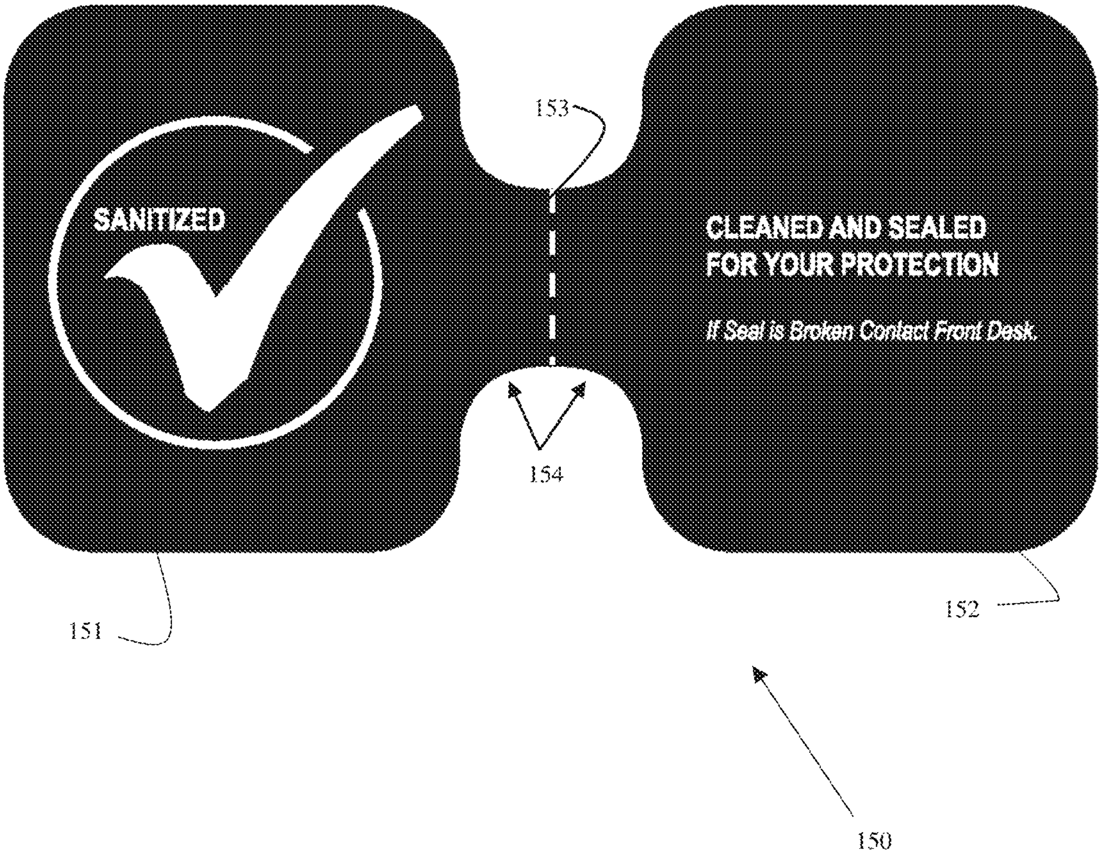
FIG. 1K is a diagram of still another tamper-evident label with custom indicia printed or imaged on the tamper, evident label, according to an example embodiment.

FIG. 1K is a diagram of still another tamper-evident label 150 with custom indicia printed or imaged on the tamper, evident label, according to an example embodiment.

Label 150 comprises a substrate organized in two halves 151 and 152. First half 151 separated from second half 152 by die cut 153. Die cut 152 extends from a top to a bottom of label 150. First half 151 and second half 152 are approximately the same length and width while a portion 154 of label 150 that adjoins the two halves 151 and 152 has a smaller length and width that what is associated with the two halves 151 and 152.

Portion 154 is designed to be placed over an opening to a door in a closed position. That is, first half 151 adheres to a first surface associated with a lid or door, second half 152 adheres to a second or different surface (such as a door frame, a toilet seat, etc.), and portion 154 covers and/or adheres over an opening or gap between the first surface and a second surface (so portion 154 may be partially adhered to both the first surface and the second surface). Any attempt to remove label 150 so as to open the door or the lid results in label 150 rearing along die cut 153 provide visual evidence that the lid or door was opened after the label 150 had been adhered over the door or lid in a closed position.

Each half 151 and 152 may be custom printed or imaged with custom indicia, such as first half 151 having custom indicia with a checkmark circled and the word "sanitized" and the second half 152 custom printed or imaged with custom indicia "cleaned and sealed for your protection . . . if seal is broken contact front desk."

Label 150 is particularly useful in providing evidence of sanitization for hotels for cabinets, doors, toilets, drawers, etc. Label 150 may also be useful in providing evidence of sanitization for rental car doors, hospital rooms and drawers or cabinets used in hospital rooms, and other industries.

Figure 1L:
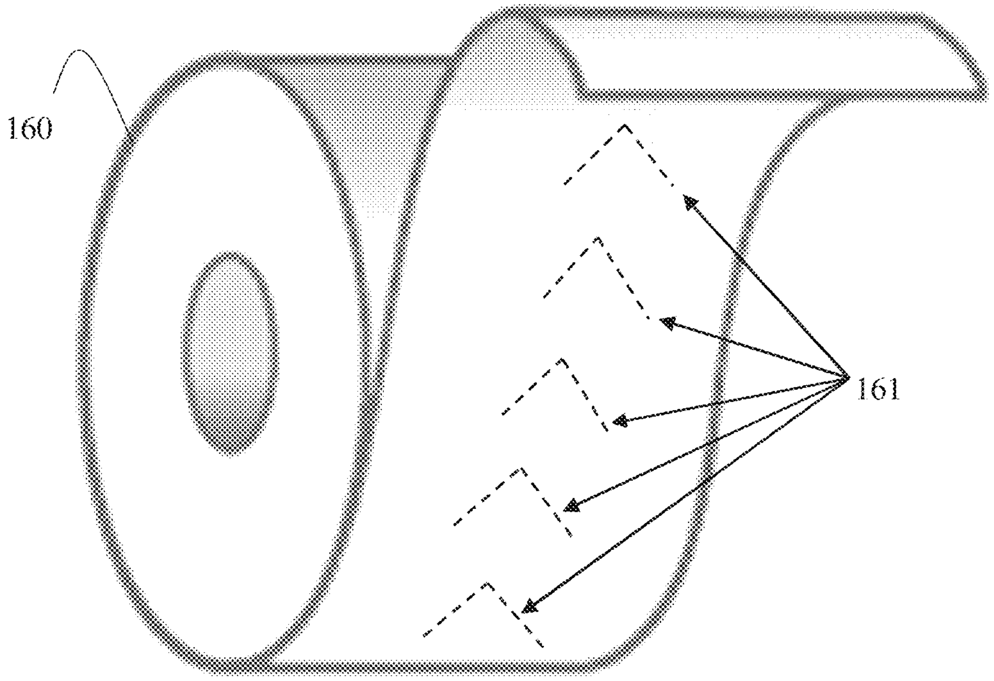
FIG. 1L is a diagram of a roll of media having a plurality of tamper-evident labels, according to an example embodiment.

FIG. 1L is a diagram of a roll 160 of print media having a plurality of tamper-evident labels, according to an example embodiment. Any of the above-referenced labels 100, 110, 120, and; or 130 may be manufactured onto and custom printed or custom imaged onto roll 160 of print media.

The roll 160 comprises a continuous web of a substrate. The web defining a plurality of the tamper-evident labels, each individually defined label comprises a plurality of perforations or die cut slits 161 designed to damage or tear each label when that label is cut from the web, adhered to a surface or an object, and an attempt is made to remove the adhered label from the surface or the object.

In an embodiment, the continuous web is manufactured without a liner; that is, each individually defined label has no liner backing or is liner-less.

It is noted that although the individually defined labels of the continuous web of the substrate for roll 160 illustrates die cuts 161 similar to what was shown in FIGS. 1A and 1B with die cuts 101, any of the above referenced, shaped, and oriented die cuts 101, 111, 121A, 121B, 131, and/or 153 may be manufactured in the continuous web of the substrate for roll 160.

Figure 2:
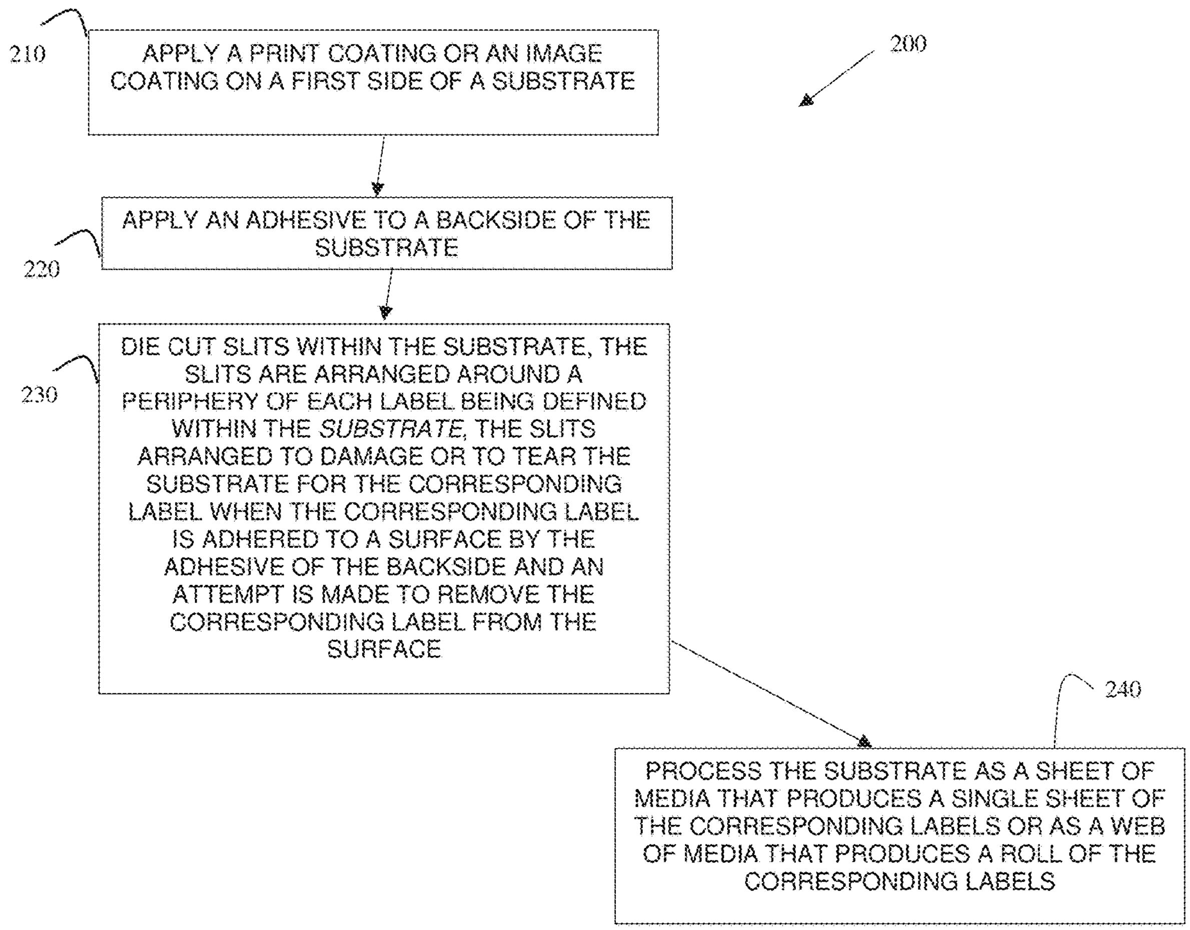
FIG. 2 is a diagram of a method of manufacturing a tamper-evident label, according to an example embodiment.

FIG. 2 is a diagram of a method 200 of manufacturing a tamper-evident label, according to an example embodiment. The method 200 is implemented by a modified flexographic or "flexo" press, which includes electromechanical components driven by firmware or software. The firmware or software comprise executable instructions that are executed by a hardware processor associated with the flexo press from a non-transitory computer-readable storage medium. The processor may be embedded in the press or may be interfaced through a control board to the electro-mechanical components of the press, such that the processor can activate and deactivate the componentry of the press to manufacture sheets 140 and/or rolls 150 of the labels 100, 110, 120, and/or 130. Furthermore, the flexo press includes a variety of stations that apply the coatings, adhesives, and perform the die cuts to manufacture the labels discussed herein and above.

At 210, the press applies a print coating or an image coating on a first side or a front side of a substrate.

At 220, the press applies an adhesive to a backside or a second side of the substrate.

At 230, the press die cuts slits within the substrate. The slits are arranged around a periphery of each label being defined within the substrate. The die cut slits arranged so as to damage, tear, or break the substrate for the corresponding label when the corresponding label is adhered to a surface by the adhesive of the backside and when an attempt is made to remove the corresponding label from the surface.

In an embodiment, at 240, the press process the substrate as a sheet 140 of media that produces single sheets of the corresponding labels or the press processes the substrate as a web of media that produces a roll 150 of the corresponding labels.

One now appreciates how tamper-evident media provided as labels 100, 110, 120, and/or 130 individually, in sheets 140, and/or rolls 150 are manufactured and subsequently imaged by printers (dot matrix, laser, and/or thermal) with customized indicia for purposes of applying to surfaces associated with openings to items or access to objects. The tamper-evident labels 100, 110, 120, and/or 130 cannot be removed from the corresponding surfaces without being damaged, torn, or broken, which when damaged, torn, or broken provides visible evidence that the items have been opened and/or that the objects have been accessed. The labels 100, 110, 120, and/or 130 can be used in a variety of industry applications from package delivery, food preparation, hospitality providing evidence of sanitization, etc.

Although the present invention has been described with particular reference to certain preferred embodiments thereof, variations and modifications of the present invention can be affected within the spirit and scope of the following claims.

The invention claimed is:

1. A label, comprising:

a substrate;

a plurality of die cuts made in first portions of the substrate;

a print coating or an image coating on a first side of the substrate; and an adhesive on a second side of the substrate;

wherein the plurality of die cuts in the first portions are arranged to damage or to tear the substrate when the label is adhered to a surface by the adhesive of the second side and an attempt is made to remove the label from the surface;

wherein the plurality of die cuts are arranged in a first set of die cuts and a second set of die cuts, the first set of die cuts is adjacent to a first end of the label and the second set of die cuts is arranged on a second end of the label, the second end is an opposing and opposite end from the first end, wherein each die cut of the first set of die cuts comprise a pair of two lines that intersect at a point and the point is oriented and pointing towards the first end and each die cut of the second set of die cuts comprises a pair of two lines that intersect at a point and the point is oriented and pointing towards the second end, wherein the pairs of the two lines of the first set of die cuts are further arranged in at least four first rows, and wherein the pairs of the two lines of the second set of die cuts are further arranged in at least four second rows, wherein the first set of die cuts extends a width of the label from a top of the label to a bottom of the label at the first end of the label, wherein the second set of die cuts extends the width of the label from the top of the label to the bottom of the label at the second end of the label, wherein the label is configured to provide visible evidence of tampering when removed.

2. The label combination of claim 1, wherein each die cut comprises a first line and a second line, wherein the first line and the second line meet at first ends of each of the respective lines.

3. The label of claim 2, wherein an intersection of first line and the second line at the first ends form an arrowhead shape.

4. The label of claim 3, wherein each arrowhead shaped set of the first and the second lines are oriented in a first direction for the first set of die cuts and are oriented in a second direction for the second sets of die cuts.

5. The label of claim 1, wherein the print coating is a dot matrix printable or a laser printable coating that permits a dot matrix printer or a laser printer to print custom indicia on the first side of the substrate.

6. The label of claim 1, wherein the image coating is a thermally imageable coating that permits a thermal printer to image custom indicia on the first side through heat selectively applied to the image coating by direct terminal imaging or by a thermal transfer imaging using a thermal ribbon.

7. A print media, comprising:

a substrate;

a plurality of labels arranged in the substrate;

each label comprising:

a plurality of die cuts made in first portions of the substrate for each of the plurality of labels;

a print coating or an image coating on a first side of the substrate for each of the plurality of labels; and an adhesive on a second side of the substrate for each of the plurality of labels;

wherein the plurality of die cuts in the first portions are arranged to damage or to tear the substrate when any of the plurality of labels is separated from the print media and adhered to a surface by the adhesive on the second side and an attempt is made to remove any of the plurality of labels from the surface;

wherein the plurality of die cuts are arranged in first set of die cuts and a second set of die cuts on each label, each first set of die cuts is adjacent to a first end of a corresponding label and each second set of die cuts is arranged on a second end of the corresponding label, the second end is an opposing and opposite end from the first end, wherein each die cut of the first set of die cuts comprises a pair of two lines that intersect at a point and the point is oriented and pointing towards the first end of the corresponding label and each die cut of the second set of die cuts comprises a pair of two lines that intersect as at a point and the point is oriented and pointing towards the second end of the corresponding label, wherein the pairs of the two lines for the first set of die cuts are further arranged in at least four rows and the pairs of the two lines for the second set of die cuts arranged in at least four second rows, wherein the first set of die cuts extend a width of the corresponding label from a top of the corresponding label to a bottom of the corresponding label at the first end of the corresponding label, wherein the second set of die cuts extends the width of the corresponding label from the top of the corresponding label to the bottom of the corresponding label at the second end of the corresponding label, wherein the labels are configured to provide visible evidence of tampering when removed.

8. The print media of claim 7 further comprising a liner substrate, the liner substrate comprising a release coating and attached to the second side of the substrate by the adhesive, wherein the print media is a sheet of media comprising multiple labels or wherein the print media is a roll of media comprising the multiple labels.

9. The print media of claim 7, wherein the image coating comprises a direct thermal image coating or a thermal transfer image coating, and wherein the print coating comprises a dot-matrix or a laser print coating.

10. The print media of claim 7, wherein each die cut of each label comprises two slit die cuts, and the corresponding slit die cuts oriented in an arrowhead shape intersecting on first ends with one another.

* * * * *